(No Model.)
L. FARIS.
VEHICLE HUB ATTACHING COLLAR.
No. 482,627. Patented Sept. 13, 1892.
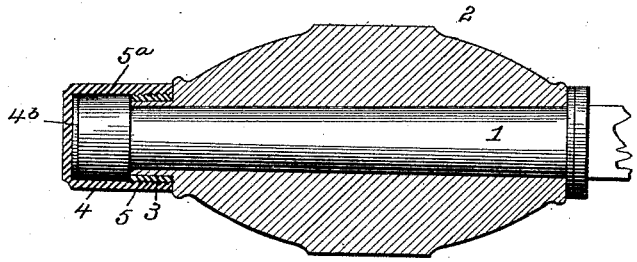
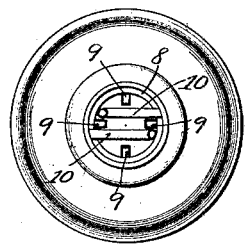
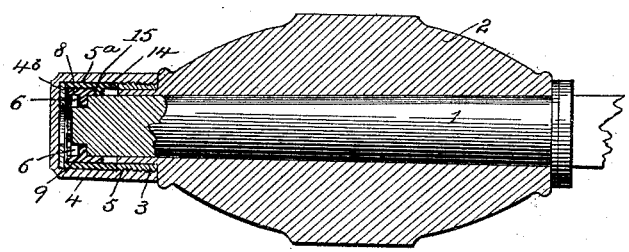
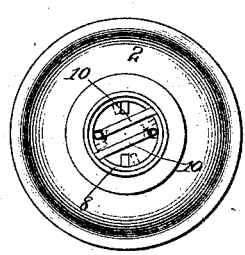
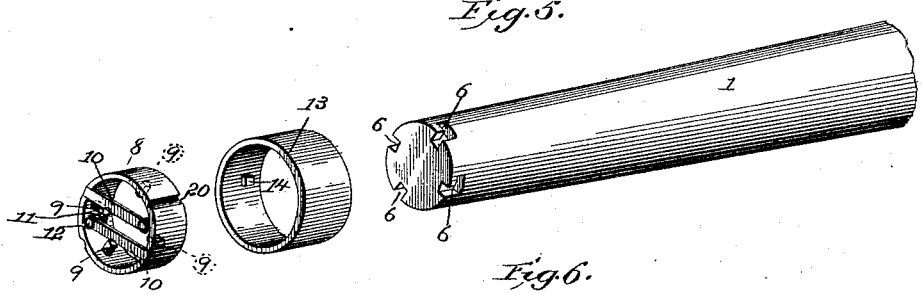
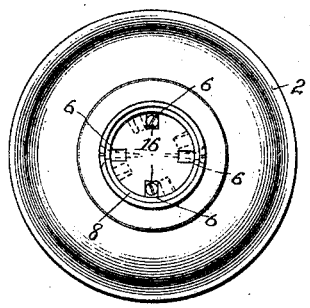
Witnesses:
Harry S. Rohrer.
Wm. E. Knight.
Inventor:
Lafayette Faris.
By Knight Bros.
Attorneys.

UNITED STATES PATENT OFFICE.

LAFAYETTE FARIS, OF PRICETOWN, OHIO.

VEHICLE-HUB-ATTACHING COLLAR.

SPECIFICATION forming part of Letters Patent No. 482,627, dated September 13, 1892.

Application filed April 5, 1892. Serial No. 427,871. (No model.)

*To all whom it may concern:*

Be it known that I, LAFAYETTE FARIS, a citizen of the United States, residing at Pricetown, Highland county, Ohio, have invented certain new and useful Improvements in a Combined Spindle and Attaching-Collar; and I do hereby declare that the following specification, taken in connection with the accompanying drawings, is a full, clear, and exact description of my improvements, such as will enable those skilled in the art to make and use the same.

My invention relates to improved means for conveniently and securely attaching hubs to their spindles or axles and is applicable particularly to securing the wheels of carriages and wagons on the axles, though it can be very conveniently employed in other connections. The hub and its axle-box are constructed, as usual, with a screw-threaded outer end, upon which is adapted to engage an interiorly-screw-threaded metal cap or nut formed with an inner bearing-surface for the friction-ring carried on the outer end of the spindle. This hub and its metal cap, in combination with my improved locking-nut and friction-ring to be hereinafter described, form a boxing and bearing for the outer end of the spindle.

My improved attaching device for securing the hub on the spindle consists of a ring or collar formed with inwardly-projecting lugs adapted to enagage the peculiarly-shaped outer end or head of the spindle and suitable means, which consists, preferably, of spring-pressed dogs for locking said retaining ring or collar into engagement. I also preferably provide a friction ring or band surrounding and secured to the locking-nut for protecting it from wear and forming a bearing for the end of the spindle.

I will first describe my invention with reference to the accompanying drawings, and then more particularly define the novel features thereof in the annexed claims.

In the drawings, Figure 1 is a longitudinal sectional view of a hub and its interiorly-screw-threaded metal cap secured on an axle-spindle by my improvements, the spindle and attaching device being represented in side elevation. Fig. 2 is a similar view representing the attaching device in section. Fig. 3 is an end view with the screw-cap removed and the parts in position to be attached to the spindle. Fig. 4 is a similar view representing the parts locked into engagement with the spindle. Fig. 5 is a perspective view representing the parts in detached position and illustrating the manner of applying them. Fig. 6 is a front end view of a modification.

1 is the spindle of an axle. 2 is the hub of a wheel, adapted to operate thereon and constructed with the screw-threaded portion 3 on the outer end of its axle-box.

4 is a metal cap or nut having the interiorly-screw-threaded portion 5 and the bearing portion $5^a$, and bearing ring or washer $4^a$ in its end. The metal cap 4 is adapted to fit over the end of the hub, and the screw-threaded portion 5 engages the screw-threaded end 3 of the hub for retaining the cap thereon. The outer end of the metal spindle 1 is formed with a series of short equidistant right-angled or elbow grooves or notches 6 in its periphery, which provide the engaging shoulders 7. The grooves 6 extend from the end of the axle longitudinally and then turn to the right and extend at right angles or circumferentially, as clearly shown in the drawings, all extending substantially parallel.

8 is my improved attaching and locking nut or ring. It consists, preferably, of a metal ring formed with a series of equidistant square radial lugs 9, extending internally and corresponding in size, number, and arrangement to the outer ends of the grooves 6, so that the ring can be fitted over the end of the spindle and the square lugs engaged in the grooves 6.

10 are two parallel spring-arms secured at their opposite ends to the outer edge of the ring 8 by rivets or other suitable means and extending across the end of the ring on opposite sides of its center. Each spring-arm 10 is provided with an inwardly-extending square dog 11 at its free end, which rests normally under the control of the spring-arm alongside of one of the inwardly-projecting square lugs 9 of the locking-ring. It will be observed that the end of the spindle 1 projects beyond the end of the hub 2 sufficiently to allow the locking-ring to be put in place.

When it is desired to lock the wheel on, it is placed on the spindle and the locking-ring presented to the end of the spindle, so that each one of the radial lugs 9 will correspond in position to the outer ends of the grooves 6. In this position the ring is pushed longitudinally into place, all of said lugs 9 entering the longitudinal terminals of said grooves 6, and the dogs 11 being forced outwardly and held in cocked position by their contact with the end of the spindle. When the ring has been pushed in as far as it will go, (or until the lugs 9 come in contact with the right-angled extensions of the grooves 6,) it is then turned to the right as far as it will go, the lugs 9 then entering the circumferential terminals of the grooves 6 and engaging the shoulders 7 and the spring-dogs 11, moving from contact with the end surface of the spindle, and springing into the outer terminals of two of said grooves 6. In this position it will be observed that the locking-ring which holds the wheel in place is prevented from moving circumferentially by means of the spring-dogs and longitudinally by means of the lugs 9 and shoulders 7. For removing the hub it is only necessary to disengage the spring-dogs from the grooves 6 and give the ring the reverse movement. For the convenient manipulation of the dogs 11 I prefer to form them with outwardly-extending heads 12, which can be conveniently taken hold of and moved against the tendency of the spring-arms.

The above is the simplest embodiment of my invention; but for the purpose of removing the wear from the locking-ring 8 I provide it with a friction-ring 13, which is wider than the locking-ring and projects a slight bit on each side to keep the spring-arms 11 out of contact with the end of the cap 4 and the rings 8 out of contact with the hub. The friction-ring 13 is attached to said ring 8, so as to be held stationary with the spindle, by means of an internal lug (or lugs) 14, which engages in the notch 15 in the inner edge of the ring 8. It will be observed that the hub 2 and the nut 4 (which is a continuation of the hub) bear against the friction-ring 13, which virtually forms the friction end of the spindle. The friction-ring can be replaced at a small cost whenever worn out.

To provide for the lubrication, I form the exterior of the locking-ring 8 with longitudinal grooves 20 and the interior of the friction-ring 13 with corresponding grooves 21, by means of which the lubricant can pass to the outer end of the spindle.

In Fig. 6 I have shown a modified arrangement of my improvements, in which the spring-dogs are omitted and the ring 8 prevented from turning by means of pins or screws 16, inserted in screw-threaded sockets 17, which may extend longitudinally in line with the longitudinal portion of groove 6 or radially at the angle of said groove, as represented by dotted lines.

I have found the above arrangement very valuable and efficient for securing wheels of all descriptions to their spindles, and it is practically impossible for them to become accidentally displaced.

Having thus described my invention, what I claim as new therein, and desire to secure by Letters Patent, is—

1. The combination of the spindle formed with angular grooves in its end, a hub on said spindle, a locking-ring provided with internal lugs adapted to be turned into engagement with said angular grooves, and means for preventing the reverse movement of said locking-ring, whereby the hub will be securely held in place, substantially as set forth.

2. The combination of the spindle formed with angular grooves in its end, a hub on said spindle, a locking-ring provided with internal lugs adapted to enter said angular grooves and be turned into engagement therewith, and suitable pins, screws, or dogs adapted to lock said ring against movement on said spindle, substantially as set forth.

3. The combination of the spindle formed with right-angled grooves near or at its end, the hub on said spindle, the locking ring or nut provided with inwardly-projecting lugs and correspondingly arranged to said grooves, said ring being adapted to be moved longitudinally and circumferentially on the spindle for causing the lugs to engage in said right-angled grooves, and spring-dogs carried by said locking-ring and adapted to engage in said grooves for holding the ring from revolving, substantially as and for the purpose set forth.

4. The combination of the spindle formed with the grooves or notches at its end, which extend longitudinally and circumferentially, the hub on said spindle, the locking ring or nut formed with inwardly-projecting lugs which are adapted to engage in said grooves, and spring-arms mounted on said locking-ring and carrying dogs at their free ends which are adapted to engage in the longitudinal terminals of said grooves, said locking ring or nut being adapted to move longitudinally on the spindle to lock the parts in position, substantially as set forth.

5. The combination of the spindle formed with grooves in its outer end, a hub on said spindle formed with a screw-threaded outer end, a locking-ring provided with inwardly-projecting lugs adapted to engage the groove of said spindle, means for retaining the lugs into engagement, a friction-ring mounted on said locking-ring and held against movement thereon, and a cap engaging the screw-threaded end of the hub and bearing against said friction-ring, substantially as set forth.

LAFAYETTE FARIS.

Witnesses:
JOHN B. FARIS,
WILLIAM DODSON.